US011359728B2

(12) United States Patent
Wolfe et al.

(10) Patent No.: US 11,359,728 B2
(45) Date of Patent: Jun. 14, 2022

(54) ANTI-CAVITATION VALVE ASSEMBLY

(71) Applicant: Griswold Industries, Costa Mesa, CA (US)

(72) Inventors: Robert Morgan Wolfe, Lake Forest, CA (US); David Michael Rose, Fountain Valley, CA (US); John Frederic Link, Austin, TX (US)

(73) Assignee: Griswold Industries, Costa Mesa, CA (US)

( * ) Notice: Subject to any disclaimer, the term of this patent is extended or adjusted under 35 U.S.C. 154(b) by 0 days.

(21) Appl. No.: 17/356,858

(22) Filed: Jun. 24, 2021

(65) Prior Publication Data

US 2022/0107027 A1    Apr. 7, 2022

Related U.S. Application Data

(60) Provisional application No. 63/088,678, filed on Oct. 7, 2020.

(51) Int. Cl.
| | |
|---|---|
| *F16K 3/34* | (2006.01) |
| *F16K 3/26* | (2006.01) |
| *F16K 47/04* | (2006.01) |
| *F16K 47/08* | (2006.01) |
| *F16K 25/04* | (2006.01) |

(52) U.S. Cl.
CPC ............... *F16K 3/34* (2013.01); *F16K 3/267* (2013.01); *F16K 25/04* (2013.01); *F16K 47/04* (2013.01); *F16K 47/08* (2013.01); *Y10T 137/86734* (2015.04); *Y10T 137/86759* (2015.04)

(58) Field of Classification Search
CPC . F16K 3/34; F16K 3/267; F16K 47/04; F16K 47/08; Y10T 137/86734; Y10T 137/86759
USPC .................. 251/127, 325; 137/625.3, 625.33
See application file for complete search history.

(56) References Cited

U.S. PATENT DOCUMENTS

| | | | |
|---|---|---|---|
| 1,307,986 A | 6/1919 | Randall et al. | |
| 1,383,005 A | 6/1921 | Mertens | |
| 1,570,907 A * | 1/1926 | Neal | F22B 37/28 |
| | | | 122/492 |
| 3,117,590 A | 1/1964 | Nelson et al. | |
| 3,157,200 A * | 11/1964 | Rowan | F16K 39/04 |
| | | | 137/625.33 |
| 3,330,294 A | 7/1967 | Manning | |
| 3,540,484 A | 11/1970 | Brown | |
| 3,693,659 A | 9/1972 | Parola | |
| 3,722,854 A | 3/1973 | Parola | |
| 3,776,278 A | 12/1973 | Allen | |
| 3,802,537 A | 4/1974 | White | |
| 3,813,079 A | 5/1974 | Baumann et al. | |

(Continued)

*Primary Examiner* — John Bastianelli
(74) *Attorney, Agent, or Firm* — Kelly & Kelley, LLP

(57) ABSTRACT

An anti-cavitation valve assembly includes a seat positioned within a fluid pathway between a fluid inlet and outlet of a valve. Spaced apart elongated seat apertures are formed in a circumferential wall of the seat that have a varying opening width along a length thereof to direct fluid flow into an inner seat chamber of the seat. A disc guide is slidably movable relative to the seat and has a wall having spaced apart disc guide apertures formed therein. A tortuous fluid flow pathway is formed as fluid enters through the seat apertures, into the inner seat chamber, and exits through the disc guide apertures to minimize fluid cavitation.

22 Claims, 12 Drawing Sheets

(56) References Cited

U.S. PATENT DOCUMENTS

| | | |
|---|---|---|
| 3,917,221 A | 11/1975 | Kubota et al. |
| 3,954,124 A | 5/1976 | Self |
| 3,990,475 A | 11/1976 | Myers |
| 4,022,423 A | 5/1977 | O'Connor et al. |
| 4,024,891 A | 5/1977 | Engel et al. |
| 4,180,100 A | 12/1979 | Kolb et al. |
| 4,249,574 A | 2/1981 | Schnall et al. |
| 4,375,821 A | 3/1983 | Nanao |
| 4,384,592 A | 5/1983 | Ng |
| 4,397,331 A | 8/1983 | Medlar |
| 4,473,210 A | 9/1984 | Brighton |
| 4,567,915 A | 2/1986 | Bates et al. |
| 4,617,963 A | 10/1986 | Stares |
| 4,650,155 A | 3/1987 | Liantonio |
| 4,679,592 A | 7/1987 | Lamb |
| 4,693,450 A | 9/1987 | Paetzel |
| 4,825,906 A | 5/1989 | Hartman |
| 4,860,993 A | 8/1989 | Goode |
| 4,921,014 A | 5/1990 | Tartaglia et al. |
| 5,018,703 A | 5/1991 | Goode |
| 5,769,123 A | 6/1998 | Heestand et al. |
| 5,964,248 A | 10/1999 | Enarson et al. |
| 6,394,134 B1 | 5/2002 | Kwon |
| 6,935,371 B2 | 8/2005 | Stares |
| 7,073,532 B2 * | 7/2006 | Bowe ............... F16K 3/265 137/625.33 |
| 7,152,628 B2 | 12/2006 | Folk et al. |
| 9,010,371 B2 | 4/2015 | Folk et al. |
| 9,759,348 B2 | 9/2017 | Adams et al. |
| 2006/0207666 A1 * | 9/2006 | Micheel ............. F16K 25/04 137/625.3 |
| 2007/0240774 A1 * | 10/2007 | McCarty ............ F16K 47/08 137/625.37 |
| 2013/0025723 A1 | 1/2013 | Dutrop |
| 2015/0108379 A1 * | 4/2015 | Juhnke ............... F16K 3/24 251/127 |
| 2017/0102076 A1 * | 4/2017 | Reynolds ........... F16K 1/52 |
| 2019/0353265 A1 * | 11/2019 | Gabriel ............. F16K 27/00 |

\* cited by examiner

ANTI-CAVITATION VALVE ASSEMBLY

RELATED APPLICATION

This application claims the benefit of U.S. Provisional Application No. 63/088,678, filed on Oct. 7, 2020.

BACKGROUND OF THE INVENTION

The present invention generally relates to control valves in high pressure fluid transfer systems, such as waterworks systems. More particularly, the present invention relates to an anti-cavitation assembly for use in such control valves so as to impart anti-cavitation and low-noise properties.

When subjected to high-pressure differentials or high flow rates, valves often exhibit excessive noise and vibration. This is usually attributable to the phenomenon of cavitation, which can range from relatively harmless levels called incipient cavitation to significant more acute levels that actually damage valves, other components, and related piping. Cavitation occurs as the velocity of the fluid in the valve seating area becomes excessive, creating a sudden severe reduction in pressure that transforms the liquid into a vapor, resulting in the formation of thousands of small bubbles. The subsequent decrease of velocity and pressure rise that occurs after the valve seating area, when the pressurized condition resumes, causes these vapor bubbles to collapse at the rate of many times per second. This can damage surfaces of the valve and piping. Over time, this can lead to valve failure due to the vibration and/or erosion.

Minimizing or eliminating the conditions that adversely affect operation and service life of the valve continues to be one of the most serious challenges encountered in the daily operation of a water distribution system, such as municipal water systems and the like. To overcome the adverse effects of the orifice action of the valve, it has become common practice to design the valve so as to break up the flow through the valve into a multitude of small streams which are then led through convoluted paths to produce energy losses in the fluid. Such designs are known as tortuous fluid flow redirection.

Various valve assemblies are known which serve to suppress vibration, pressure fluctuations, cavitation and noise. Some are rendered ineffective due to varying flows, which can make their devices ineffective. Yet others are prone to fouling or clogging due to the use of small apertures, requiring that the fluid must be filtered before passing through the valve assembly. There exist other anti-cavitation valve seats and assemblies that are generally good at preventing cavitation damage at pressure drops up to 150 psi. However, market trends are now looking for valve products capable of performing trouble free at higher pressure drops, such as 300 psi or higher.

Accordingly, there is a need for a new anti-cavitation valve assembly which overcomes the drawbacks and shortcomings of prior anti-cavitation valve designs. Such an assembly should be capable of operating at much higher pressure drops, such as 300 psi or higher. The present invention fulfills these needs, and provides other related advantages.

SUMMARY OF THE INVENTION

The present invention resides in an anti-cavitation valve assembly which minimizes or even eliminates fluid cavitation, and its attendant noise and damage, as fluid flows through a valve, such as a control or main valve of a waterworks system. Use of the anti-cavitation valve assembly of the present invention allows such control valves to perform trouble free at higher pressure drops, such as three hundred psi or higher.

The anti-cavitation valve assembly of the present invention generally comprises a seat fixedly positionable within a fluid pathway between a fluid inlet and a fluid outlet of a valve. The seat has a circumferential wall at least partially defining an inner seat chamber. The wall has a plurality of spaced apart elongated seat apertures formed therein. The seat apertures have varying opening width along a length thereof.

A disc guide is slidably movable relative to the seat so as to cooperate with the seat in opening and closing fluid flow between the inlet and outlet of the valve. The disc guide includes a wall having a plurality of spaced apart disc guide apertures formed therein. Typically, the wall of the disc guide has an upper portion having the disc guide apertures formed therein in a lower portion that increasingly occludes the seat apertures as the disc guide is moved into the closed position. Preferably, the disc guide apertures are formed at a non-normal angle through the disc guide wall. There are typically a greater number of disc guide apertures than seat apertures. There may be twice as many disc guide apertures as seat apertures.

A tortuous fluid flow pathway is formed as fluid enters through the seat apertures and into the inner seat chamber and exit through the disc guide apertures to minimize fluid cavitation.

The seat apertures are arranged so as to direct fluid to converge in the seat inner chamber. The seat apertures are geometrically configured to have a larger opening width at a top portion thereof and a smaller opening width at a lower portion thereof. The seat apertures may have a lower tip opening, a lower opening portion of a generally consistent width, a middle portion having an increasingly wider width, and a top portion having a generally consistent width.

When the assembly is open 10% or less, the collective flow through the seat apertures is as small as 25% of the collective flow area through the disc guide apertures. When the assembly is open 10%-25%, the collective flow area through the seat apertures is approximately half of the collective flow area through the disc guide apertures. When the assembly is open 25% to 80%, the collective flow area through the seat apertures increases until 80% or greater open when the collective flow area through the seat apertures and the disc guide apertures are approximately equal.

A deflector wall may extend upwardly from a base of the seat in spaced relation to the seat apertures. The deflector wall may have a scalloped or irregular top edge. The deflector wall may be tapered inwardly away from the seat apertures. The non-apertured lower portion of the disc guide wall extends into the space between the seat apertures and the deflector wall when moved towards a closed position.

A boss extends upwardly through the base of the seat and has a through aperture that accepts a stem associated with a disc guide therein. The boss is configured to vary fluid flow therethrough and into the seat inner chamber as the stem is moved along a length of the boss.

A perimeter lip of the disc guide is engageable with an upper portion of the seat. The perimeter lip of the disc guide has a chamfered profile that improves valve regulation stability when the lip is disposed adjacent to the seat.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings, for purpose of illustration, the present invention resides in an anti-cavitation assembly which imparts anti-cavitation and noise-reducing characteristics to a main valve or other control valve in fluid transfer systems, such as waterworks systems.

Figure 1:
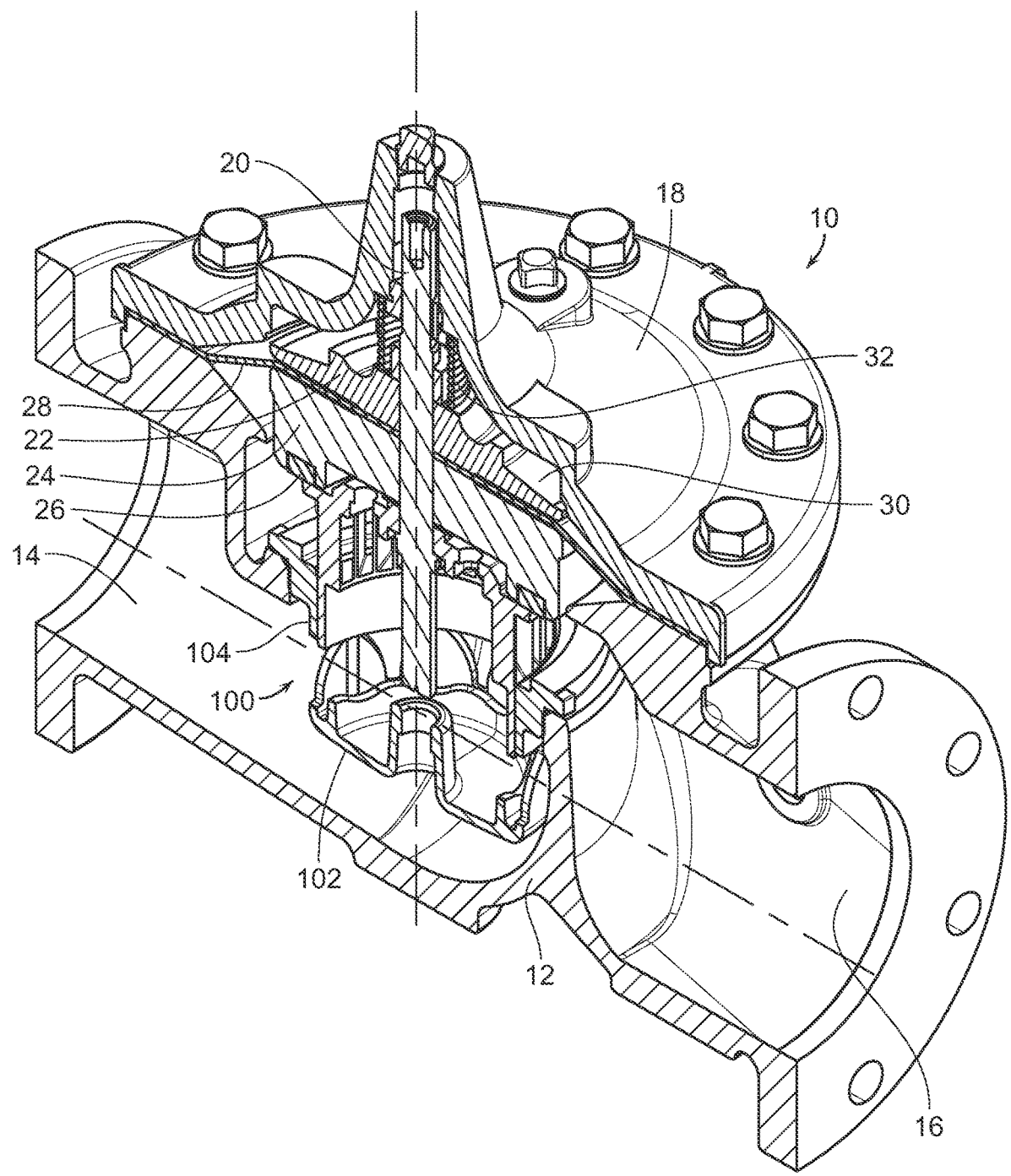
FIG. 1 is a sectioned perspective view of a control valve incorporating the anti-cavitation assembly of the present invention in an open position.

With reference now to FIG. 1, a waterworks main valve 10 is shown. The valve 10 includes a valve body 12 forming a fluid flow passageway having a fluid inlet 14 and a fluid outlet 16. A cover 18 is attached to the valve body 12. A stem assembly includes a stem 20 which extends through a diaphragm washer 22 and a disc retainer 24 having a sealing disc 26. A diaphragm 28 is sandwiched between the diaphragm washer 22 and disc retainer 24 as well as the cover 18 and body 16.

In a standard valve, without anti-cavitation properties, a seat is disposed between the inlet 14 and outlet 16. The seat is in general alignment with the disc retainer 24 and more particularly the disc 26, such that as the disc 26 is lowered it comes into engagement with an upper portion of the seat so as to open or close fluid flow through the valve 10.

Figure 2:
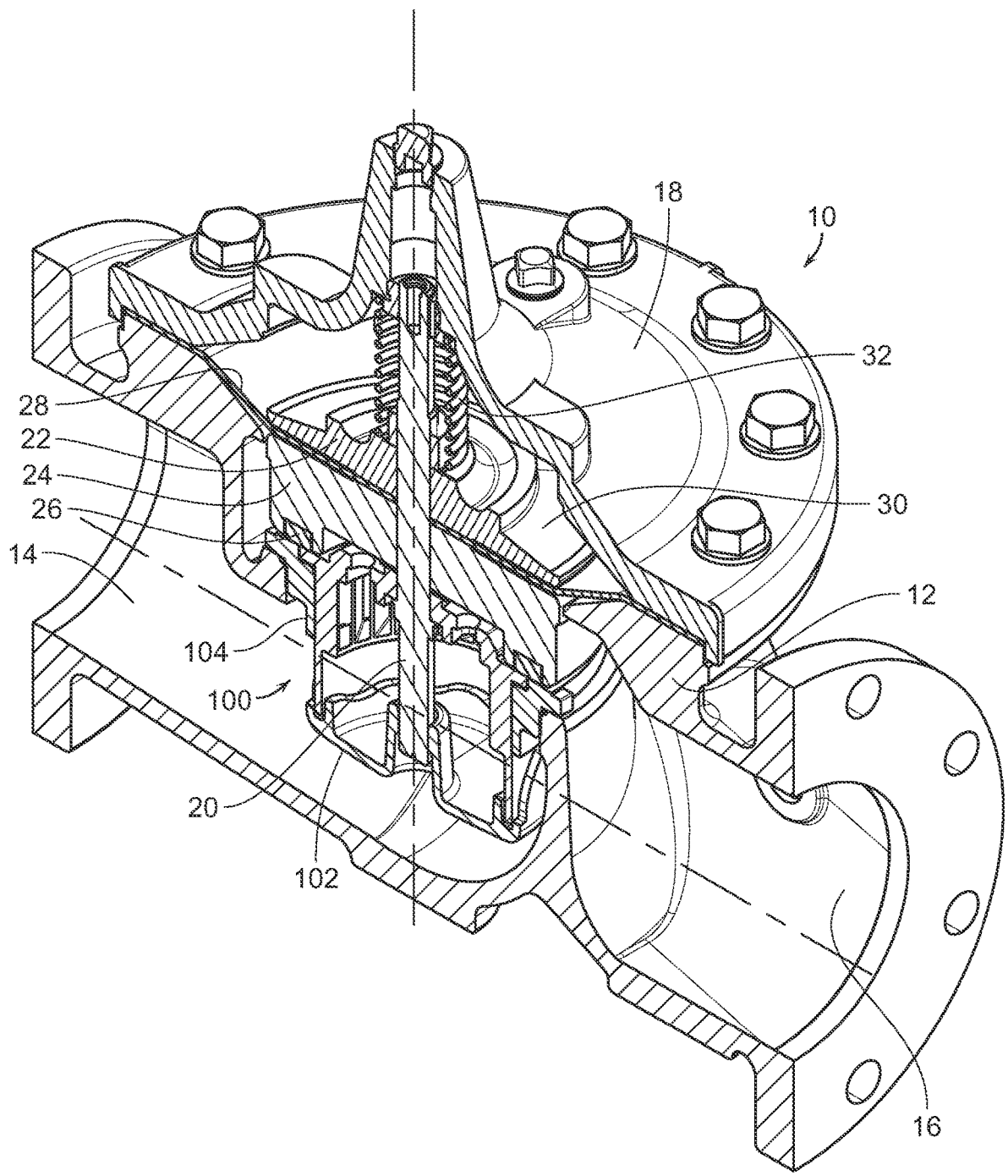
FIG. 2 is a sectioned perspective view similar to FIG. 1, but illustrating the anti-cavitation assembly in a closed position.

As is known in the art, when the pressure in a pressure chamber 30 of the valve 10 is proportionally less than the pressure at the valve inlet 14, pressure forces overcome forces of a spring 32, which biases the diaphragm washer 22, diaphragm 28, disc retainer 24, and disc 26 upwardly into the pressure chamber 30, thus opening the valve 10, as illustrated in FIG. 1. However, when the pressure within the pressure chamber 30 is equal to or greater than the valve inlet 14 pressure and the valve outlet 16 pressure, the pressure assists the force of the spring 32 and moves the diaphragm 28, and its interconnected components, downward to close the valve 10, as illustrated in FIG. 2.

In the present invention, an anti-cavitation assembly 100 is incorporated into the valve 10, which includes a seat 102 and a disc guide 104. As will be more fully described below, the seat 102 and disc guide 104 cooperatively form a tortuous pathway for the fluid to pass through, creating pressure drops in the fluid and avoiding cavitation and noise and the drawbacks associated with such. The anti-cavitation assembly 100 of the present invention is designed so as to be capable of performing trouble free at higher pressure drops, such as three hundred psi or higher. The anti-cavitation assembly 100 is designed to accomplish this goal without reducing the flow capacity through the valve 10.

Figure 3:
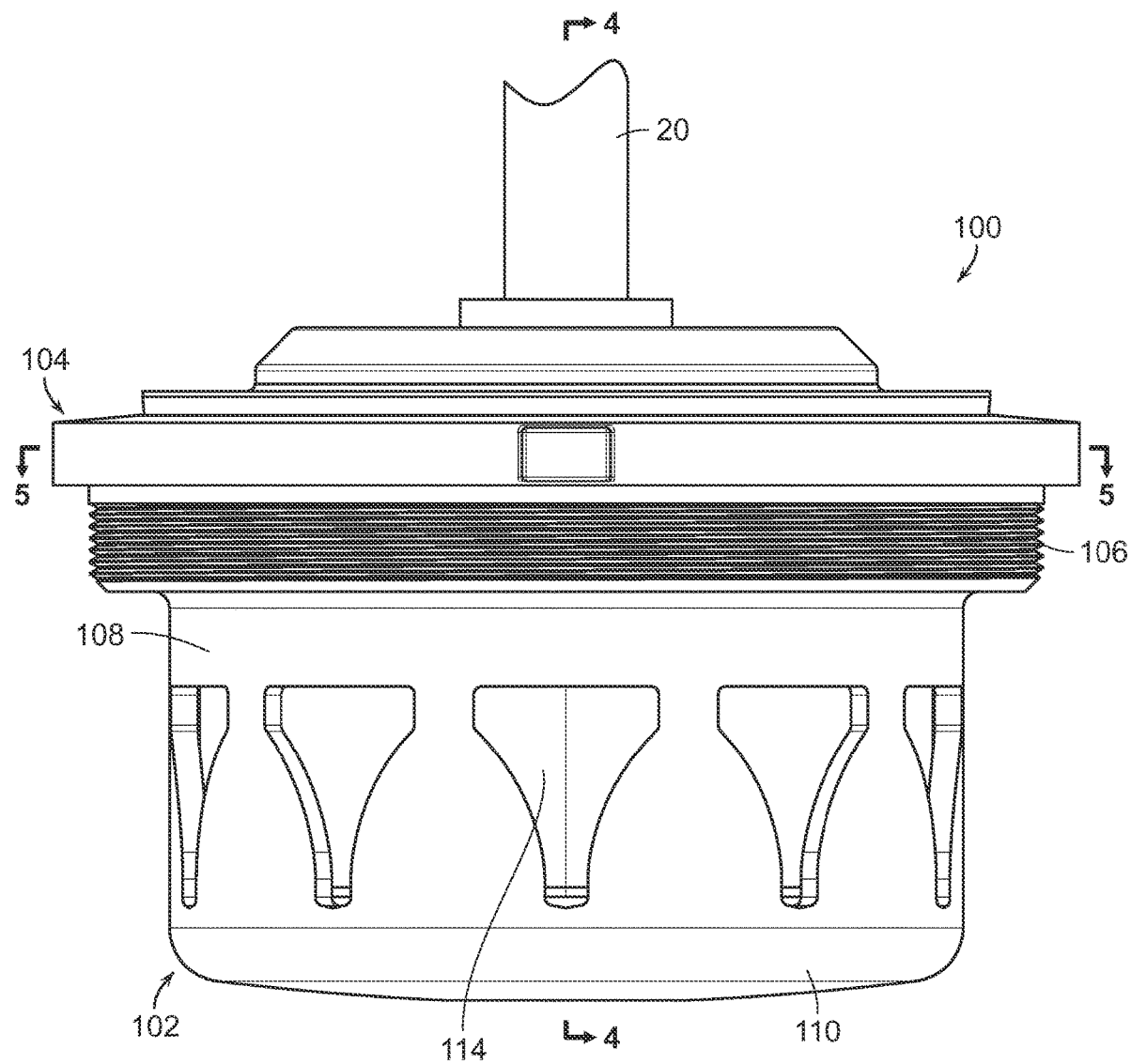
FIG. 3 is a front perspective view of an anti-cavitation seat and an anti-cavitation disc guide, nearly fully disposed within the seat, comprising the anti-cavitation assembly of the present invention.
Figure 4:
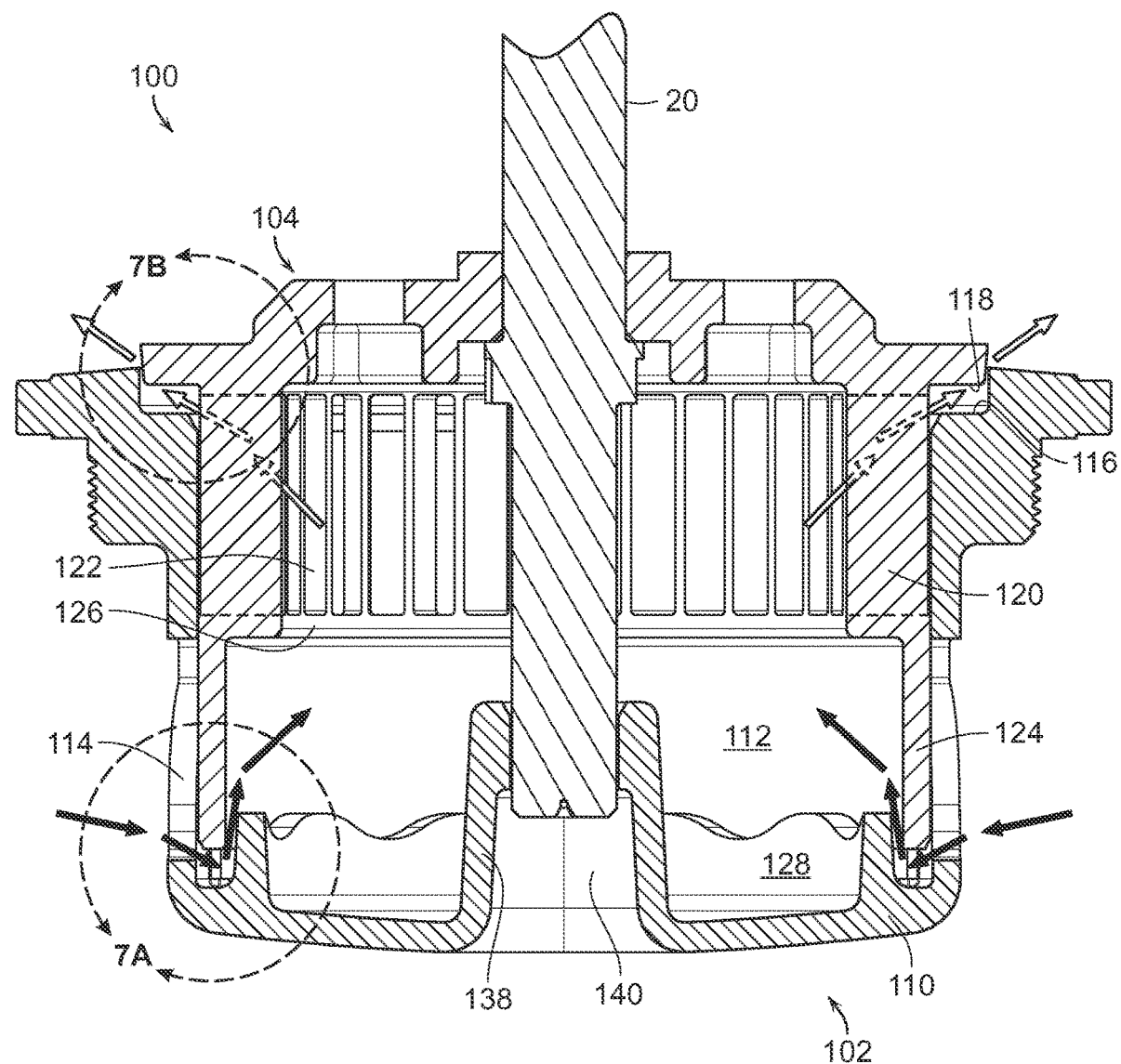
FIG. 4 is a cross-sectional view taken generally along 4-4 of FIG. 3, illustrating the disc guide disposed within the seat.
Figure 5:
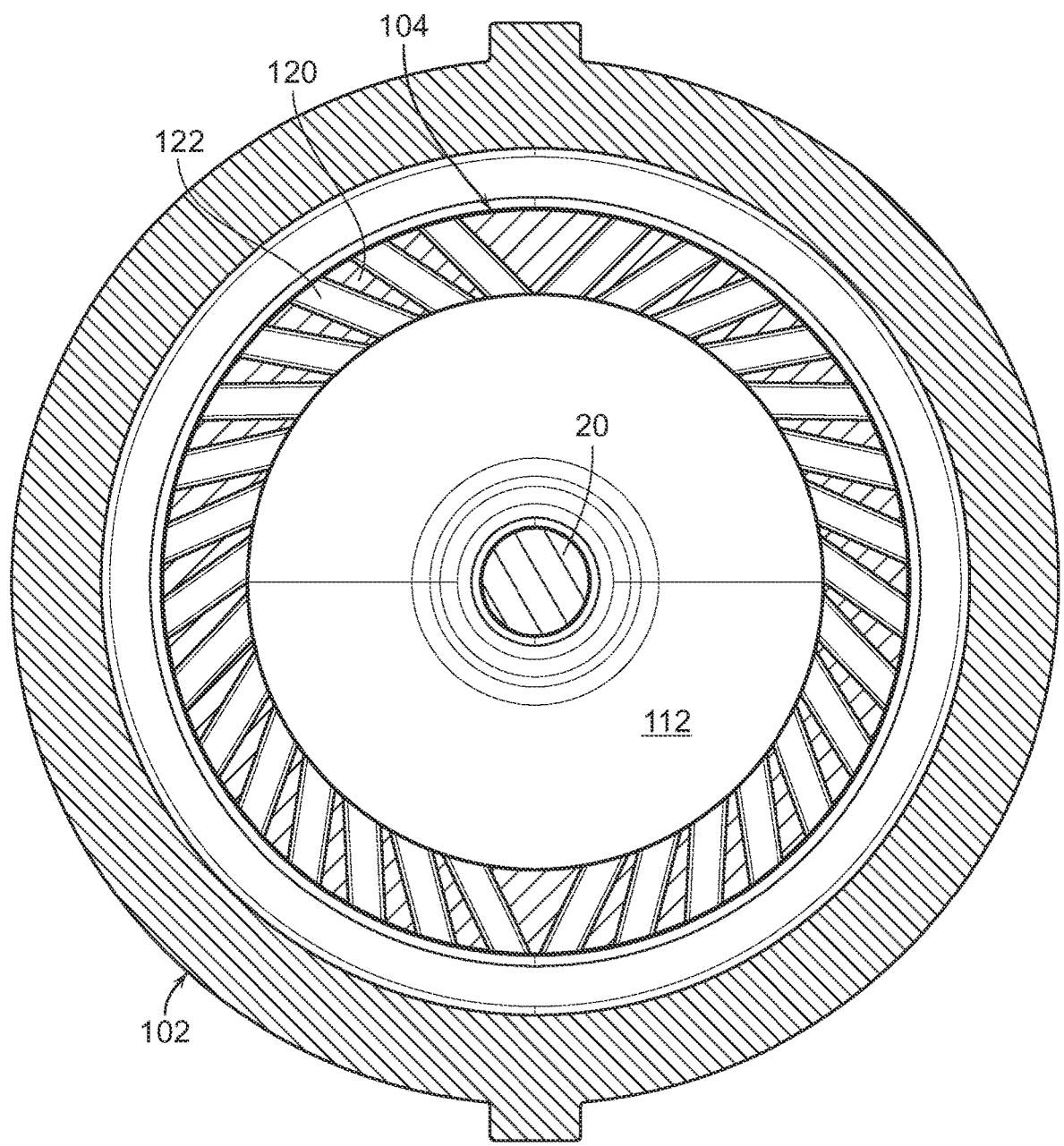
FIG. 5 is a cross-sectional view taken generally along line 5-5 of FIG. 3, illustrating various components of the assembly, including disc guide apertures formed through a wall of the disc guide.

The seat 102 may include an attachment feature or mechanism, such as the illustrated external threads 106, so as to attach the seat 102 to the body 12 of the valve 10. It is contemplated by the invention that the seat 102 could be attached to the body 12 of the valve 10 by other features or mechanisms, so long as the attachment provides a substantially waterproof seal therebetween. With reference to FIGS. 3-5, the disc guide 104 is insertable or retractable into the seat 102 as the valve stem 20 is raised and lowered, as described above.

As can be seen in FIGS. 3 and 4, the seat 102 is typically bowl-shaped. The seat 102 has a perimeter wall 108 which extends upwardly from a base 110. The circumferential wall 108 and base 110 at least partially define a seat inner chamber 112. A plurality of spaced apart elongated apertures 114 are formed through the perimeter wall 108 so as to allow fluid to pass therethrough and into the inner seat chamber 112. Preferably, the seat fluid inlet apertures 114 are substantially equally spaced apart along the entire perimeter of the seat wall 108, as illustrated.

As can be seen in the attached illustrations, the seat 102 is generally bowl-shaped or having a generally cylindrical configuration. The seat inner chamber 112 is sized and configured so as to receive at least a portion of the disc guide 104 therein. The disc guide 104, as illustrated, is generally cylindrical in configuration and sized and configured so as to be received into and out of the inner chamber 112 of the seat 102. The disc guide 104 is slidably movable relative to the seat 102 so as to cooperate with the seat 102 in opening and closing fluid flow between the inlet 14 and outlet 16 of the main or control valve 10. As the disc guide 104 is moved into the seat 102, fluid flow is increasingly diminished. However, as the disc guide 104 is retracted from the seat 102, into an open position, fluid flow is increased therethrough. The seat 102 includes an upper peripheral rim portion 116 which is engageable with a sealing lip 118 of the disc guide 104, such that when the disc guide 104 is fully inserted into the seat 102 fluid flow through the valve 10 is closed off.

The seat 102 and the disc guide 104 have been designed so as to operate at high differential pressure conditions without experiencing cavitation damage to critical components of the valve 10. Sealing areas in and around the seat 102, and particularly the outlet of the seat, are protected from damaging cavitation conditions as the pressure drops in this critical area are low due to the configuration of the seat geometry. Features of the seat have been designed to reduce the pressure drop in stages so the pressure drop in the critical area of the seat outlet is kept to a minimum.

With reference again to FIGS. 4 and 5, the disc guide 104 includes an outer peripheral wall 120 having a plurality of spaced apart apertures 122 formed therethrough through which fluid flows. More particularly, the wall 120 has a lower portion 124 which is generally solid, and an upper portion 126 having the plurality of apertures 122, in the form of elongated slots, formed therein so as to extend fully through the wall 126. The apertures 122 are generally spaced apart from one another, preferably substantially equally spaced from one another.

Moreover, the apertures 122 are formed at a non-normal angle through the wall 120, such as forming an acute angle through the wall, as illustrated in FIG. 5. The apertures 122 are formed through the wall 120 in such a manner such that fluid which flows from the hollow interior of the disc guide 104 is directed at a non-ninety-degree angle, such as at an acute angle when exiting the apertures 122. Forming the apertures 122 at a non-normal angle, such as at an acute angle, or even at an obtuse angle, creates a more tortuous fluid flow while also directing the fluid indirectly to any surfaces it might encounter after exiting these apertures 122.

Typically, there are a greater number of disc guide apertures 122 as seat apertures 114. Preferably, there are twice as many disc guide apertures 122 as seat apertures 114. The disc guide apertures 122 may be of a generally consistent width so as to have a generally consistent fluid flow therethrough. The cumulative fluid flow area of the disc guide apertures 122 may be approximately equivalent to the total cumulative fluid flow area of the seat apertures 114, however.

As mentioned above, the disc guide wall 120 has a lower portion 124 which is non-apertured. As the disc guide 104 is moved into the closed position, increasingly being disposed within the seat 102, the lower portion 124 of the disc guide wall 120 increasingly occludes the seat apertures 114, and thus the fluid flow through the assembly 100.

The seat apertures 114 are arranged such so as to direct fluid entering therethrough to converge in the seat inner chamber 112. The seat apertures 114 have a varying open width along a length thereof, such that as the disc guide 104 is raised or lowered, and the degree of occlusion or blockage by the lower portion 124 of the wall 120 of the disc guide 104 is varied, a varying flow area through the seat apertures 114 is created. As illustrated, the seat flow apertures 114 have geometrically-shaped aperture openings which increasingly narrow from the top thereof to the bottom thereof. Thus, the seat apertures 114 are geometrically configured to have a larger opening width at a top portion thereof and a smaller opening width at a lower portion thereof.

Figure 6A:
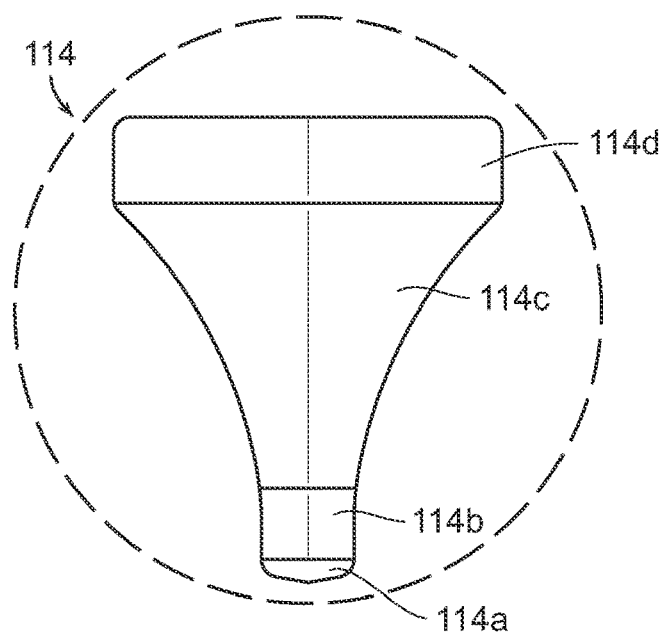
FIGS. 6A-6E are views of a seat aperture embodying the present invention with varying opening width along a length thereof that permit varying degrees of fluid flow therethrough as the disc guide is moved into open and closed positions, in accordance with the present invention.

With reference now to FIGS. 6A-6E, a front view of a seat aperture 114 is shown. FIG. 6A illustrates, in diagrammatic fashion, the different portions or opening areas of the aperture 114. A lowermost portion defines a tip opening 114a, which may be generally triangular in shape. Immediately above the tip opening 114a, is a lower opening portion 114b. The lower opening portion 114b preferably has a generally consistent width. A middle portion 114c has an increasingly wider width, as illustrated. The aperture side walls may be angled or curved such that the opening has a generally increasingly wider width along a length thereof. An upper or top portion 114d of the aperture 114, however, has a generally consistent width, such that the opposing side edges are generally parallel with one another, similar to the lower opening portion 114b, and unlike the middle portion 114c.

Figure 6B:
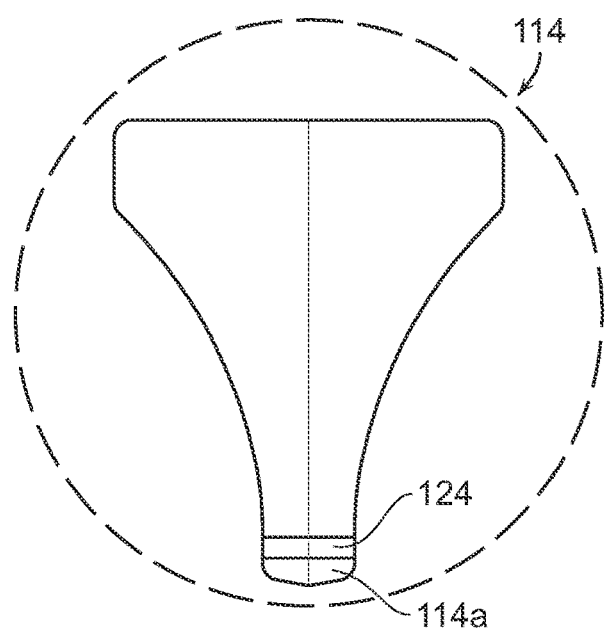

With reference now to FIG. 6B, when the lower portion 124 of the wall 120 of the disc guide 104 is moved into a nearly fully closed position all but the lower tip opening or portion 114a of the seat aperture 114 is occluded or closed, and thus fluid can only flow through the lower tip opening 114a. In this position, with only the lower tip openings 114a being open to fluid flow. This occurs when the assembly 100 is approximately 10% open. At valve positions of 10% open or less, the seat apertures 114 collectively have as small as a 25% combined flow area as the combined flow area of the disc guide seat apertures 122. The triangular shape of the lower tip opening 114a is purposely used so that as the valve starts to open, the area through this opening 114a is considerably less than the flow area through the exit flow path of the combined disc guide apertures 122. This restricted area ensures that the major portion of the pressure drop occurs through the seat duct opening 114a when the valve is operating near the closed position, such as 10% open or less.

Figure 6C:
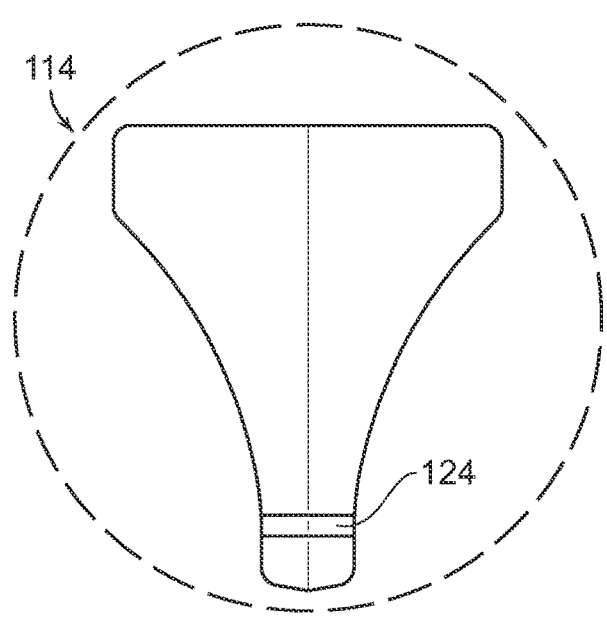

With reference now to FIG. 6C, when the disc guide is moved upwardly into a greater opening position, such as between 10% and 25% open, the bottom of the lower portion 124 of the seat guide wall 120 is disposed in the lower opening portion 114b of the seat apertures 114. In this position, the width of the slot of the seat apertures 114 and lower tip 114a are sized so that the cumulative flow area of the seat apertures 114 at this position is approximately half the flow area through the combined disc guide slots 122.

Thus, as the valve opens further flow area through the combined opening of the lower tip 114a and at least a portion of the lower portion area 114b, defined by the vertical slot shape as illustrated in FIG. 6A, for the first 25% of the disc guide travel opening, the width of the portion 114b of the aperture and the number of the apertures 114 are such so that at valve positions between 10% and 25% open, the flow area through these openings 114a and 114b are approximately half the combined flow area through the disc guide apertures 122. This area relationship allows the majority of the pressure drop through the valve to occur through the seat aperture openings, meaning a considerably smaller pressure drop occurs at flow exits through the disc guide apertures 122.

Figure 6D:
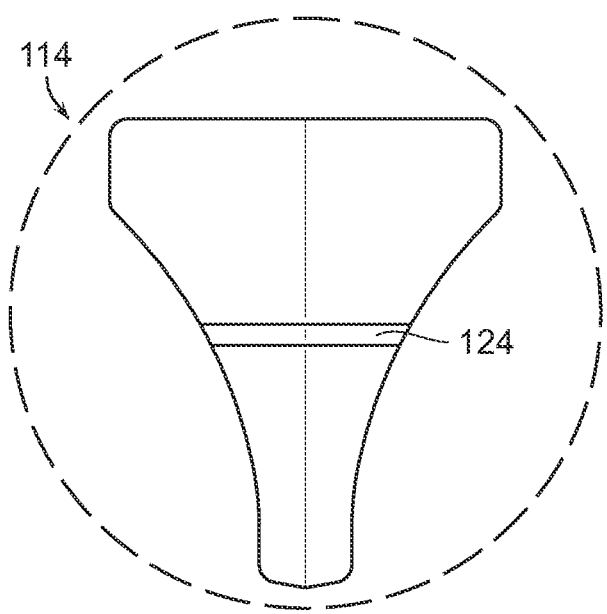

At valve positions between 25% and 80% open, as illustrated in FIG. 6D, a lower edge of the lower portion 124 of the disc guide wall 120 is disposed within the middle portion 114c of the seat apertures 114, the flow area ratio between the seat aperture openings and the disc guide apertures increasingly increases. At valve positions between 25% and 80% open, the pressure drop into the inner seat chamber 112 is still considerably higher than the pressure drop through the disc guide apertures 122.

Even though the ratio of flow areas between the seat aperture openings 114 and the disc guide apertures 122 is gradually becoming equal, a higher pressure drop through the seat aperture openings of areas 114a, 114b and 114c are still achieved because of a combination of variables. At the valve positions between 25% and 80% open, as illustrated in FIG. 6D, the exposed seat aperture flow areas are still smaller than the combined disc guide aperture flow areas. Fluid flow into the inner seat chamber 112 impinges on flow from opposing seat aperture openings and this converging of flows into the center of the seat chamber area creates an additional pressure drop.

Figure 6E:
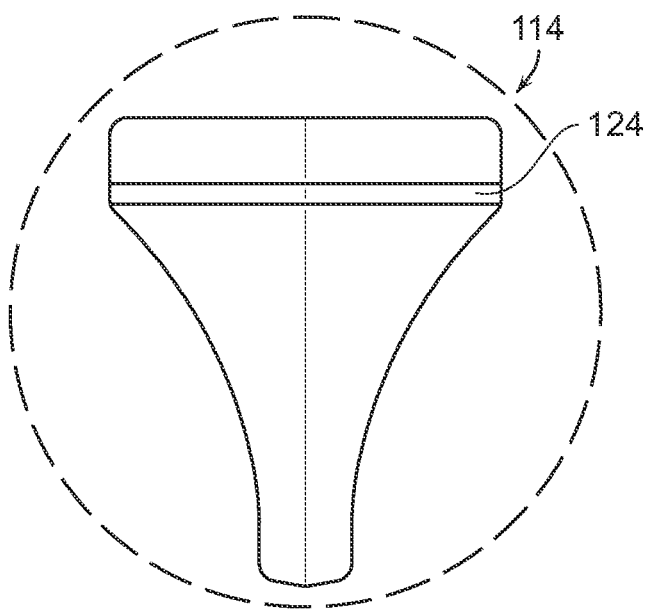

With reference to FIG. 6E, when the lower edge of the lower portion 124 of the disc guide wall 120 is disposed at or within the top portion 114d of the seat apertures 114, such as when the valve position is between 80% and 100% open. At valve positions between 80% and 100% open, the combined flow areas of the seat apertures 114 and the disc guide apertures 122 are approximately equal. However, even though the ratio of flow areas between the seat aperture openings 114 and the disc aperture openings 122 is approximately equal, the turbulent flow conditions caused by the fluid converging within the inner chamber 112 creates a pressure drop in the seat chamber 112 that is still somewhat higher than the pressure drop through the disc guide apertures 122.

The seat 102 may also include a deflector 128 within the inner seat chamber 112 and in spaced relation to the seat apertures 114. The deflector 128 typically extends from the base 110 and into the seat 102, such as to be concentric with the outer wall 108 of the seat 102. The deflector 128 is comprised of a wall having a height which is lower than the wall 108 of the seat 102. The space 130 between the seat apertures 114 and the outer wall surface 132 of the deflector 128 forms a fluid passageway and is sufficiently large such that the lower portion 124 of the disc guide wall 120 may be inserted therein, as illustrated in FIGS. 4 and 7A.

The deflector 128, such as the outer wall surface 132, may be tapered, such as being slightly tapered inwardly, as illustrated, so that as the valve opens, more flow area is exposed between the deflector 128 and the lower portion 124 of the disc guide wall. An upper rim or edge 134 of the deflector 128 may have a non-planar or irregular geometry or configuration, such as the illustrated scallop profile. The deflector 128, and its irregular rim, increase the tortuous fluid path for the fluid passing thereover, which in turn increases the pressure drop occurring between the seat fluid inlet apertures 114 and the inner seat chamber 112. This arrangement and method of restricting and deflecting fluid flow through the seat 102 creates a greater pressure drop in the seat chamber 112, which is away from critical sealing surfaces and pressure boundary components of the valve 10.

Figure 7A:
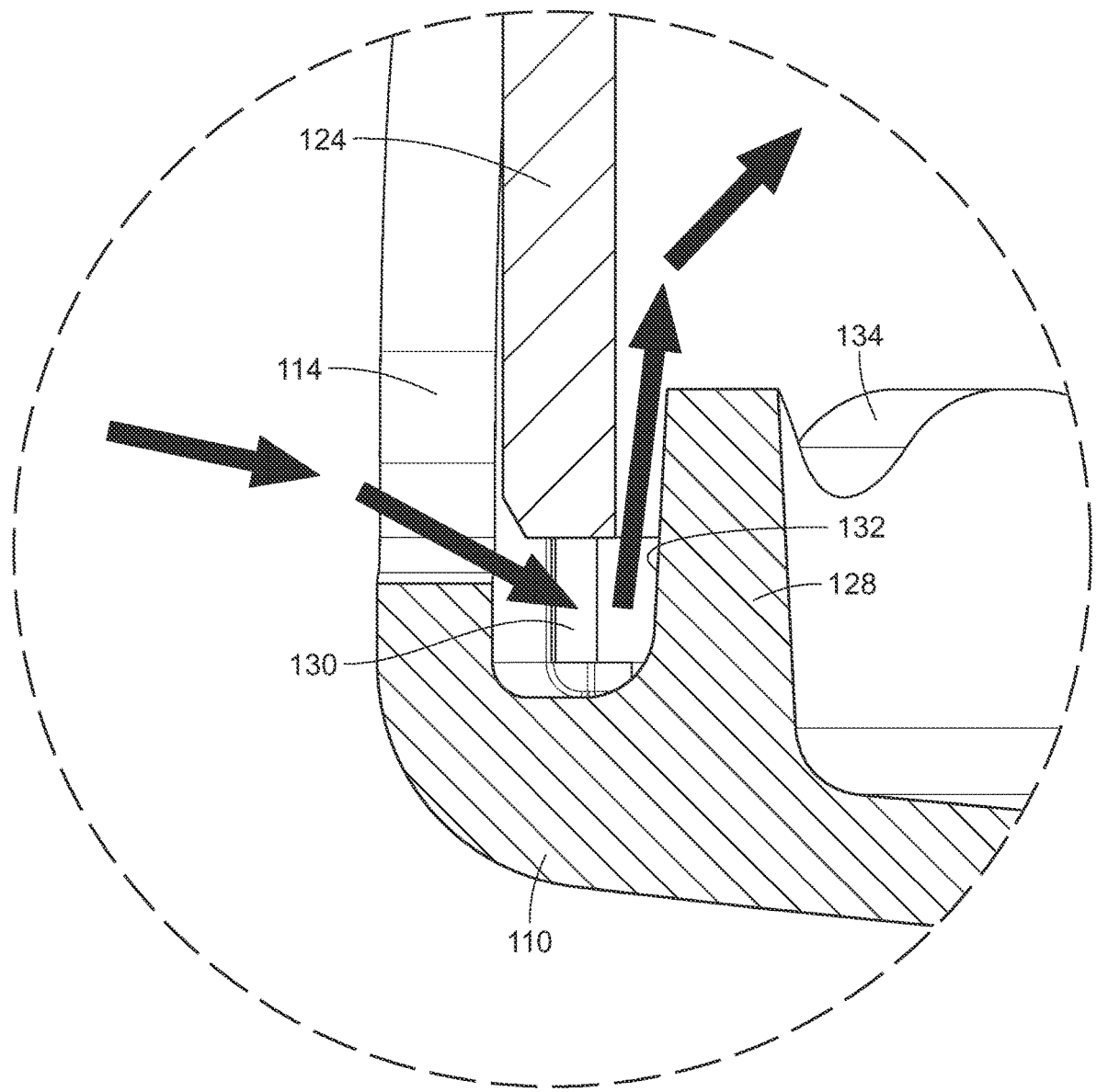
FIG. 7A is an enlarged view of area 7A of FIG. 4, illustrating an inlet flow path when a flow aperture of the seat is partially open.

The shape of the seat fluid inlet apertures 114 and their positional relationship with the inner deflector 128, as well as the position of the disc guide 104, and particularly the lower solid portion 124 of the disc guide 104 creates a restricted tortuous fluid path when the disc guide portion of the valve is operating close to the seat 102, such as illustrated in FIGS. 4 and 7A. As mentioned above, the seat apertures 114 around the seat perimeter wall 108 are preferably one-half the number of the total disc guide aperture slots 122 so that the flow area at the bottom of the inlet seat aperture 114, which is nearly perpendicular and straight and comprising the lower opening portion 114b is approximately the width of the disc guide slots 122, so at valve open positions of 25% or less, the flow area through the partially opened seat apertures 114 is approximately half the flow area through the combined disc guide apertures 122. This area relationship, along with the internal deflector geometry, results in a pressure drop through the seat flow apertures 114 that will be at least two times the pressure drop through the disc guide apertures 122. By restricting flow between the seat apertures 114 and the inner seat chamber area 112, fluid energy is expended in the form of high pressure drop and most of the pressure drop occurs in these areas and not through the disc guide apertures 122. Additional pressure drop occurs as fluid flow enters the inner seat chamber 112 due to the deflector 128. The deflector 128 directs fluid flow through a narrow pathway 130, as illustrated in FIG. 7A, and eventually into the inner seat chamber 112. Thus, any potential cavitation conditions occur in the areas between the seat aperture fluid openings 114 and the inner seat chamber area 112. By utilizing this design strategy, a greater overall pressure drop can occur through the valve 10 without the occurrence of damaging cavitation condition in critical areas, such as seat sealing surfaces.

As shown in FIG. 7A, which is an enlarged view of area "7A" of FIG. 4, fluid flow, shown by the arrows, passes through the open or exposed area of seat aperture 114, into passageway 130, and between the lower portion 124 of disc guide wall 120 and the deflector 128, flowing in a non-direct, tortuous pathway defined by the seat 102, lower wall portion 124 of the disc guide 104 and the deflector 128. The fluid then flows over the upper peripheral scalloped rim 134 of the deflector 128 and into the central cavity 112 of the seat 102 before flowing out of the disc guide apertures 122.

Figure 8:
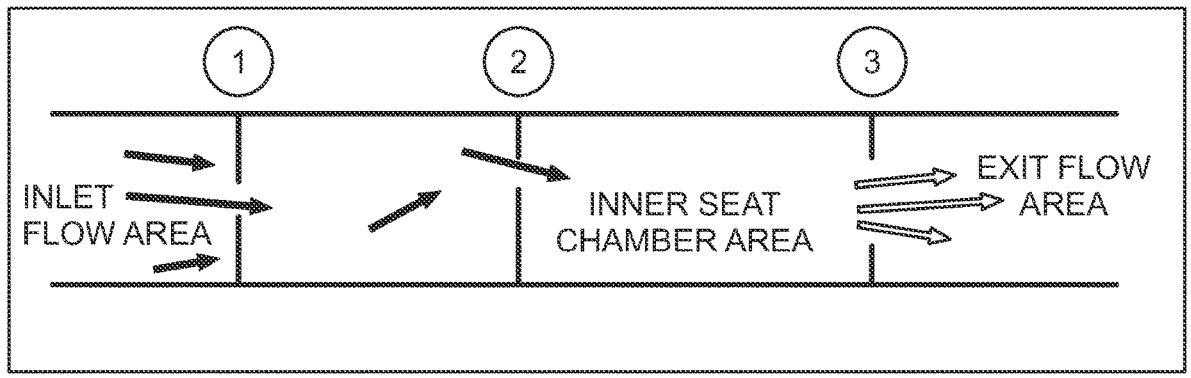
FIG. 8 is a diagrammatic view illustrating pressure reduction as fluid flows through the anti-cavitation assembly of the present invention.

FIG. 8 is a diagram to help illustrate and explain how the pressure drop is staged through the assembly 100 of the present invention. This diagram shows a series of orifices in a pipeline, where orifice "1" represents the seat aperture openings 114, orifice "2" represents the flow path change through the deflector 128 and into the inner seat chamber 112, and orifice "3" represents the exit flow area through the disc guide apertures 122. Orifice 1 has a flow area less than one-half the area of orifice 3. Flow through orifice 2 has an estimated pressure drop equivalent to the pressure drop through orifice 1 as flow between orifices 1 and 2 changes direction as it travels through this restricted flow path of orifice 2 and into the inner seat chamber area 112. Flow exits through orifice 3 which has an open orifice area approximately two times the area of orifice 1. Using this representative example, a pressure drop profile through the orifices can analytically demonstrate how the majority of the pressure drops through the assembly occurs between the inlet flow area and the inner seat chamber area.

FIG. 8 does not show what can be described as a fourth stage, which is present when the valve is nearly closed, such as being between 0%-15% open, such that the disc guide 104 is nearly completely or completely in a closed position. The profile of the perimeter lip 118, engageable with the upper portion 116 of the seat 102 has a profile that improves valve regulation stability when disposed adjacent to the seat and creates an additional pressure drop as fluid flow exits the seat 102.

Figure 7B:
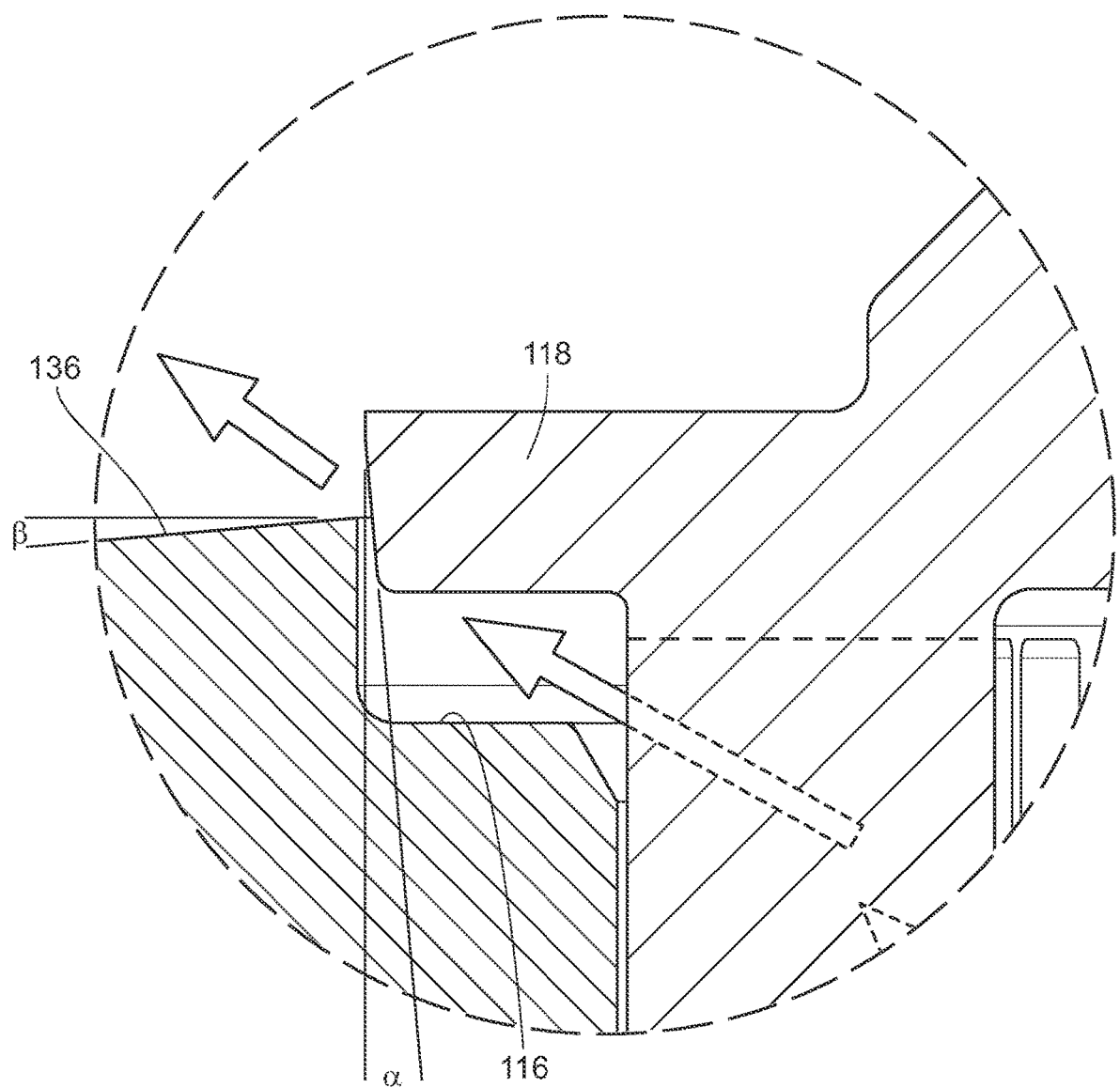
FIG. 7B is an enlarged view of area 7B of FIG. 4, illustrating a fluid exit flow path when the assembly is partially open.

With reference to FIG. 7B, an enlarged view of area "7B" is shown when the valve arrangement is operating close to the seat sealing surfaces, which is typically 0%-15% open. A perimeter lip 118 of the disc guide has a diameter slightly less than the diameter of the seat 102. An upper portion of the lip 118 is generally flat or has a normal angle. However, the remainder of the lip 118 is chamfered, so as to have an angle α of 5°-10°. The initial upper flat profile restricts flow exiting through the seat 102 when the valve is just starting to open. By restricting the exit flow area through the valve at initial opening, an extremely low flow condition can be achieved which is beneficial for regulation stability when the disc guide 104 is operating close to the seat 102. This allows for a large capacity control valve to flow in a low-demand situation without overreacting on initial valve opening and likewise dampens the closing speed of the valve when the system flow demand drops to a near zero flow demand situation giving the valve regulation stability both as it opens and as it closes. It can be seen that the outer edge 136 is angled or beveled, such as by angle β to assist fluid flow. As the system demand further increases, the fluid flow is still somewhat restricted due to the shallow 5°-10° chamfer detail and profile on the disc guide perimeter 118. This additional gradient restriction allows the valve to open further with a relatively small increase in flow demand until the disc guide perimeter lip 118 geometry fully clears the seat detail. When the disc guide perimeter profile 118 has cleared the seat opening diameter, the valve has achieved sufficient lift to continue opening in a stable manner as system demand continues to increase.

The additional valve travel created by the disc guide 104 and the chamfer detail of the lip 118 allows for a smoother transition to low-flow demand changes when the disc guide 104 is operating out or near the seat 102, typically with the valve assembly being 0%-15% open. The aforementioned geometry profile is also believed to be beneficial in reducing the potential for cavitation damage when the valve is operating in the same positions near the valve seat 102. The restricted open geometry creates an additional pressure drop stage through the anti-cavitation features of the seat 102 and disc guide 104. Staged pressure drops are achieved through the seat apertures 114, through the deflector 128, through the disc guide slots 122 and finally through the low-flow chamfered profile of the disc guide lip 118.

The additional pressure drop stage is especially important when the valve is operating near the closed position, as described above. In this case, as the valve tends to open, with the disc guide 104 moving away from the seat 102 with increasing demand changes means the exit flow area is greater across the valve sealing surface between the lip 118 and sealing surface 116 of the seat 102. The greater exit area, created by the chamfered profile results in a smaller pressure drop in this region which reduces or eliminates the possibility of cavitation creation and/or cavitation damage to critical sealing surfaces of the seat 102. Moreover, the anti-cavitation valve assembly 100 as a whole is capable of operating at total pressure drop conditions greater than similar anti-cavitation valve products currently used in the waterworks industry.

To allow for an increased flow capacity when the valve is operating at or near full open positions, such as valve positions greater than 60% open, an internal boss 138 may be located in the base of the seat 110, such as generally in the center of the seat 102. The boss 138 extends upwardly through the base 110 of the seat 102 and accepts the stem 20 associated with the disc guide 104 within fluid passageway 140 that extends through the boss 138. The boss 138 is configured to vary fluid flow therethrough and into the seat inner chamber 112 as the stem 120 is moved along a length of the boss 138. At disc guide 104 positions less than 60% open, flow through the boss passageway 140 is blocked, as illustrated in FIG. 4. However, as the valve approaches positions greater than 60% open, the stem 20 movement allows for fluid flow to pass through the fluid center hole passageway 140, as illustrated in FIGS. 9 and 10.

Fluid passing through this center hole passageway 140 mingles or collides with fluid flow passing through the seat apertures 114, which creates a turbulent flow condition in the inner seat chamber 112. This turbulent flow activity causes a larger pressure drop between the inlets of the seat 102 and inner seat chamber 112, and any resultant cavitation conditions are harmlessly dissipated within the inner seat chamber 112, away from critical seat sealing surfaces and pressure boundary components.

Incorporation of the boss 138 and central fluid passageway 140 also allows for an increased total flow area and valve capacity is slightly increased when flow is allowed to pass through the opening 140. Typically, additional flow demand conditions occur at valve positions greater than 80% open. The length of the stem 20, or the height of the boss 138, can be adjusted so flow through the passageway 140 can occur at other valve positions, such as 50% open, or less or greater. Whether or not these alternate opening conditions are needed depends on the pressure and flow conditions encountered in a particular application and the stem 20 and/or boss 138 can be configured accordingly.

Figure 9:
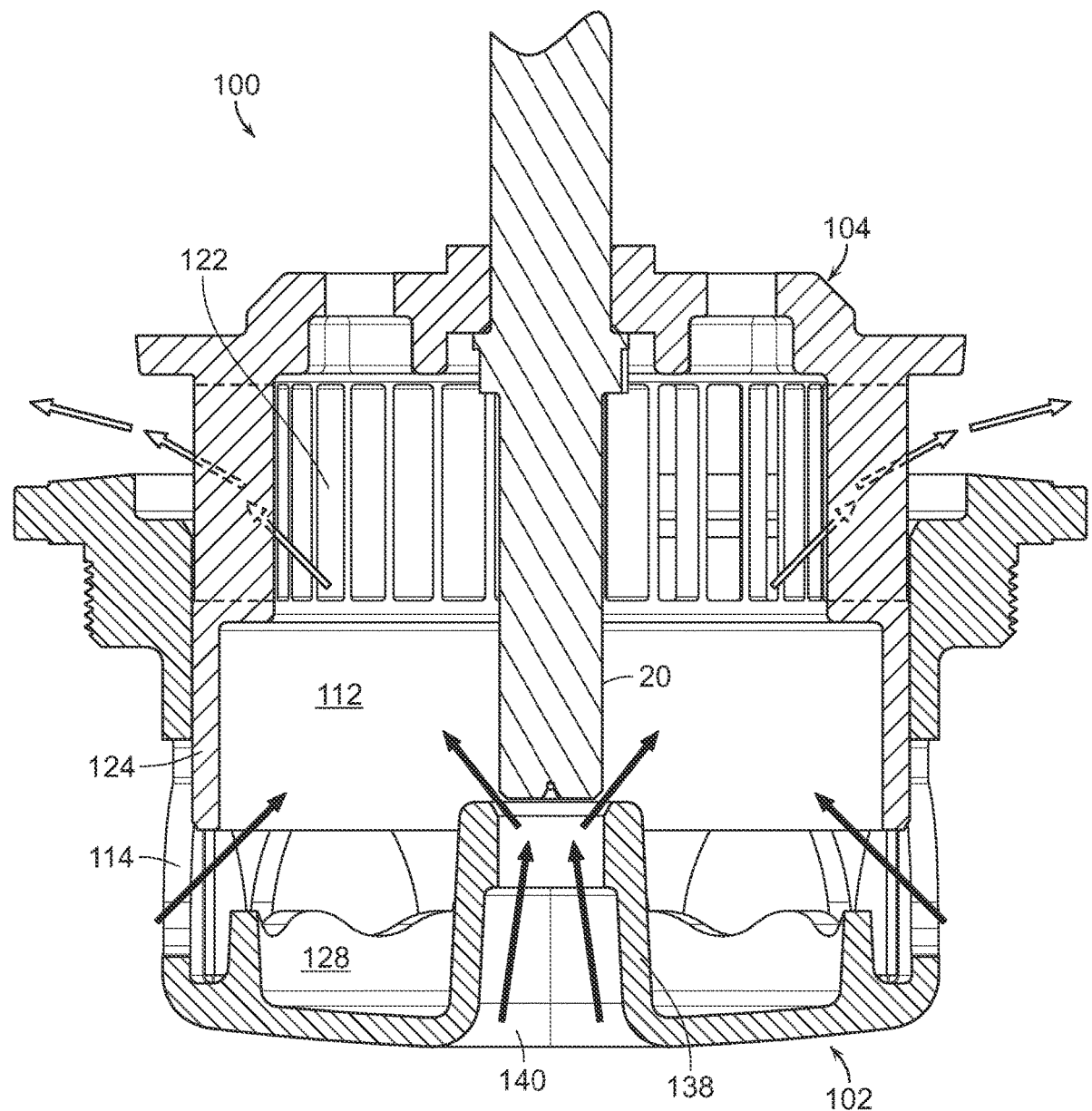
FIG. 9 is a cross-sectional view similar to FIG. 4, illustrating fluid flow through the assembly when the disc guide is moved into a nearly open position.
Figure 10:
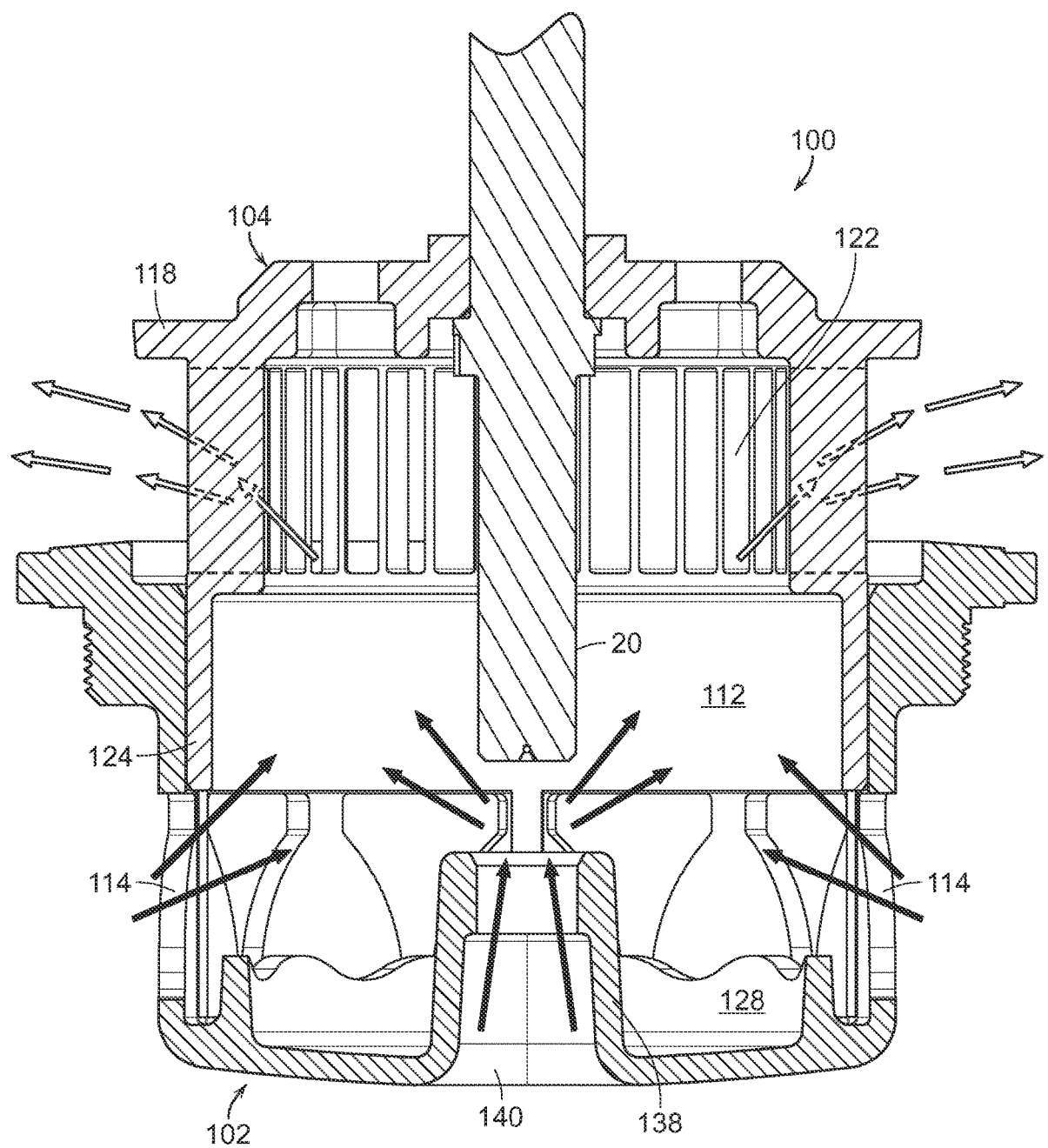
FIG. 10 is a sectioned view of the assembly of the present invention, similar to FIG. 9, illustrating fluid flow through the assembly when the disc guide is in a fully open position.

With reference to FIG. 9, the valve assembly 100 is shown in a partially open position, such as in the 60% open position wherein the center flow passageway 140 is just starting to open as the stem 20 is being removed from the boss 138, allowing some small flow of fluid into the inner seat chamber 112 where it mixes with flow coming from the seat apertures 114. In this position, the flow through the center hole passageway 138 is not significant when compared to flow through the seat apertures 114, but it is sufficient enough to disrupt flow into the inner chamber 112 which helps to contribute to a proportionally bigger pressures drop between the valve inlet and the inner seat chamber 112. This allows for a smaller pressure drop to occur through the disc guide apertures 122, meaning there is a less likely possibility for cavitation damage to occur to the critical sealing surfaces of the seat 102.

With reference to FIG. 10, the valve assembly 100 is shown in the full open position, with the stem 20 completely removed from the boss 138. In this position, the central passageway flow hole 140 is fully exposed allowing additional fluid flow into the inner seat chamber 112, where it mixes with fluid flowing from the seat apertures 114. In this position, the flow area through the boss central passageway 138 is approximately equivalent to half the flow through the seat apertures 114. This additional flow area helps to slightly boost the overall flow capacity through the valve assembly 100. Flow through this central passageway 138 is also helpful in disrupting flow into the inner seat chamber 112 which helps to contribute to a proportionally bigger pressure drop between the valve inlet and the inner seat chamber 112. This allows for both an increase in valve flow capacity and a smaller pressure drop to occur through the disc guide apertures 122, meaning there is a less likelihood for the possibility of cavitation damage to occur to the critical sealing surfaces of the seat 102.

Fluid flow activity through the boss passageway 138 assists, by disruptive flow activity, in causing a larger pressure drop between the valve inlet and the inner seat chamber 112. When the valve opening in greater than 50% open, the flow deflector 128 is less effective in disrupting flow into the inner seat chamber 112. Moreover, the lower portion 124 of the disc guide wall 120 is typically not in the direct flow path of the deflector 128 when the valve is greater than 25% open, which means its impact on disrupting or creating a tortuous flow path becomes less and less effective as the valve continues to open further. This diminished flow disruption condition of the deflector 128 is offset by the disruptive flow condition caused by the flow activity through the passageway 138 of the boss 140. Thus, throughout the full valve stroke, both the deflector 128 and the boss passageway 138 contribute to minimizing or eliminating potential damaging cavitation to critical sealing surfaces because extreme cavitation conditions occur in the inner seat chamber 112 where it harmlessly dissipates. Pressure drop through the disc guide apertures 122 and other exit flow areas is considerably lower meaning there is less likelihood for the occurrence of damaging cavitation to occur in these critical areas.

Thus, there are several variables and designs and configurations of the assembly 100 of the present invention which causes the majority of the pressure drop to occur between fluid flowing into the seat 102 and into the inner seat chamber 112, resulting in a smaller pressure drop through the fluid exiting through the disc guide apertures 122. Such includes seat aperture flow areas that are smaller in flow area than the disc guide slots, flow into the inner seat chamber 112 impinging on flow from opposing seat aperture openings 114, the converging of flows into the center of the seat chamber area creating additional pressure drop. The deflector 128 also redirects upwardly and creates a turbulent flow condition as it mixes with other fluid streams and converges in the inner seat chamber area 112. The scallop profile, or other irregular rim surface, on the defector 128 also contributes to the turbulent flow conditions as the fluid passes into the inner seat chamber 112. At a given percentage open condition, such as 60% and greater openings, fluid is allowed to flow through the seat boss fluid passageway 140, disrupting flow into the inner chamber 112 by converging and mingling with flow entering through the seat apertures 114. Fluid flowing through the seat 102 in such a manner results in all extreme cavitation conditions occurring within the seat 102, and in areas, such as the inner seat chamber 112 which are unaffected by extreme cavitation conditions.

Even when the disc guide 104 is fully opened or nearly fully opened, such as being between 80% and 100% open such that the lower portion 124 of the disc guide wall 120 is within the top portion 114d of the seat aperture 114 or not occluding the seat whatsoever, the pressure drop into the inner seat chamber 112 is still somewhat higher than the pressure drop through the disc guide apertures 122. Even though the ratio of combined flow area is between the seat apertures 114 and the disc guide apertures 122 is approximately equal, the turbulent flow conditions caused by the deflector 128 create higher pressure drops into the inner seat chamber 112 and with the smallest pressure drops through the disc guide apertures 122. Additional turbulent flow conditions are caused by fluid entering through the boss fluid passageway 140 when the valve position is sufficiently open, such as 60% open or greater, such that the stem is partially or fully removed from the boss 138. By having equal flow areas for the seat apertures 114 and disc guide apertures 122 and an additional flow area through the seat center hole boss 138, the valve assembly 100 is able to achieve flow capacities equal to valves with standard cavitation trim yet damaging cavitation to critical areas is less likely when the valve is greater than 80% open as any potential cavitation conditions typically occur away from these areas as the valve approaches the full open position.

Figure 11:
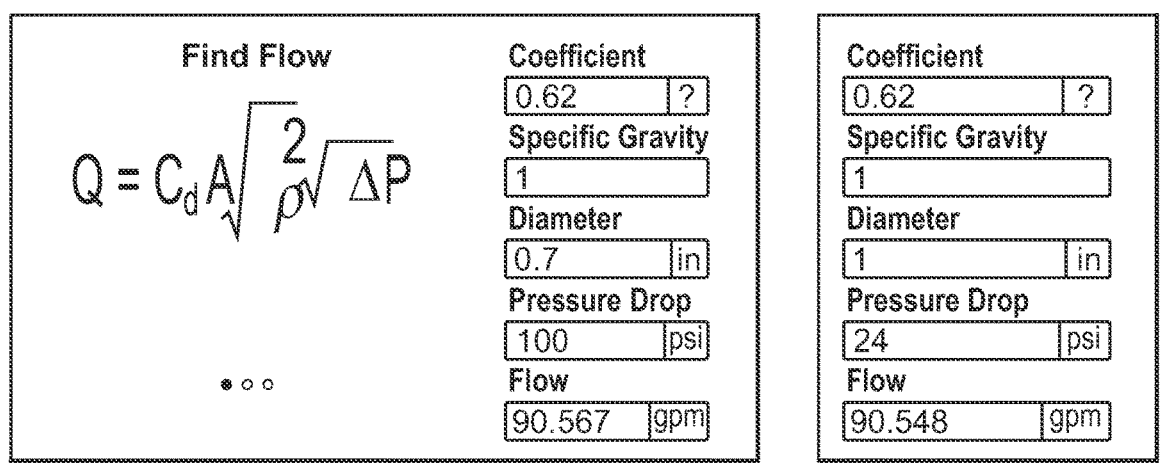
FIG. 11 is a diagram depicting an orifice flow formula and calculator used to determine pressure drop through the anti-cavitation assembly of the present invention.

The representative pressure drops through each orifice 1-3 of FIG. 8 can be determined. Using a representative flow rate of 90.567 gallons per minute through the series of orifices and orifice diameters, such as 0.70 inch for orifices 1 and 2 and 1.0 inch for the third orifice, a pressure drop profile can be calculated. The example of using orifice diameters of 0.70 inch and 1.0 inch is used as the flow area through the 0.70 inch orifices is approximately one-half the area of the 1.0 inch orifice. This is the same area relationship between the seat aperture flow openings 114 and disc guide flow apertures 122. An orifice flow calculator, per the orifice flow formula shown in FIG. 11, can be used to determine the pressure drop through these orifices.

Using these results, a 100 psi pressure drop is calculated for the 0.70 inch diameter first and second orifices or areas, and a 24 psi pressure drop for the 1.0 inch diameter orifice or slot 124.

If, from the above example, a 300 psi starting inlet pressure will drop to 100 psi at the inner seat chamber area 112. Then pressure from the inner seat chamber area will drop from 100 psi to 76 psi at the exit flow area through the exit slots 122. So, in this analogous stage pressure drop example, the majority of the pressure drop occurs through the seat inlet apertures 114 and through the seat deflector 128, and the lowest pressure drop occurs through the disc guide apertures 122, which is the purpose of the design so as to avoid damaging cavitation at the outlets 122. Computer flow design software can be used to demonstrate the stage pressure drop characteristics of this design, including how modifying the geometrically shaped seat flow apertures 114 and geometry and shape of the inner deflector 128 improves or changes the anti-cavitation characteristics of the valve.

Although several embodiments have been described in detail for purposes of illustration, various modifications may be made without departing from the scope and spirit of the invention. Accordingly, the invention is not to be limited, except as by the appended claims.

What is claimed is:

1. An anti-cavitation valve assembly, comprising:
   a seat fixedly positionable within a fluid pathway between a fluid inlet and a fluid outlet of a valve, the seat having a circumferential wall at least partially defining an inner seat chamber, the wall having a plurality of spaced apart elongated seat apertures formed therein, the seat apertures having a varying opening width along a length thereof;
   a disc guide slidably movable relative to the seat so as to cooperate with the seat in opening and closing fluid flow between the inlet and the outlet of the valve, the disc guide including a wall having a plurality of spaced apart disc guide apertures formed therein; and
   a boss extending upwardly though a base of the seat and having a through aperture that accepts a stem, that moves the disc guide, therein, the boss being configured to vary fluid flow therethrough and into the seat inner chamber as the stem is moved along a length of the boss;
   wherein the seat apertures are arranged so as to direct fluid to converge in the seat inner chamber;
   wherein the wall of the disc guide has an upper portion having the disc guide apertures formed therein and a lower portion that increasingly occludes the seat apertures as the disc guide is moved into the closed position;
   wherein the seat apertures are geometrically configured to have a larger opening width at a top portion thereof and a smaller opening width at a lower portion thereof; and
   wherein a tortuous fluid flow pathway is formed as fluid enters through the seat apertures and into the inner seat chamber and exits through the disc guide apertures to minimize fluid cavitation.

2. The assembly of claim 1, wherein the seat apertures each have a lower tip opening, a lower opening portion of a generally consistent width, a middle portion having an increasingly wider width, and a top portion having a generally consistent width.

3. The assembly of claim 1, wherein when the assembly is open 10% or less, the collective flow area through the seat apertures is as small as 25% of the collective flow area through the disc guide apertures; and wherein when the assembly is open 10%-25%, the collective flow area through the seat apertures is approximately half of the collective flow area through the disc guide apertures; and wherein when the assembly is open 25% to 80%, the collective flow area through the seat apertures increases until at 80% open the collective flow area through the seat apertures and the disc guide apertures are approximately equal.

4. The assembly of claim 1, wherein there are a greater number of disc guide apertures than seat apertures.

5. The assembly of claim 4, wherein the are twice as many disc guide apertures as seat apertures.

6. The assembly of claim 1, wherein the disc guide apertures are formed at a non-normal angle through the disc guide wall.

7. The assembly of claim 1, including a deflector wall extending upwardly from a base of the seat in spaced relation to the seat apertures.

8. The assembly of claim 7, wherein a non-apertured lower portion of the disc guide wall extends into the space between the seat apertures and the deflector wall when moved towards a closed position.

9. The assembly of claim 7, wherein the deflector wall has a scalloped or irregular top edge.

10. The assembly of claim 7, wherein the deflector wall is tapered inwardly away from the seat apertures.

11. The assembly of claim 1, wherein a perimeter lip of the disc guide engageable with an upper portion of the seat has a chamfered profile that improves valve regulation stability when disposed adjacent to the seat.

12. An anti-cavitation valve assembly, comprising:
 a seat fixedly positionable within a fluid pathway between a fluid inlet and a fluid outlet of a valve, the seat having a circumferential wall at least partially defining an inner seat chamber, the wall having a plurality of spaced apart elongated seat apertures formed therein so as to direct fluid to converge in the seat inner chamber, the seat apertures being configured so as to have a larger flow area at a top portion thereof and a smaller flow area at a lower end thereof;
 a disc guide slidably movable relative to the seat so as to cooperate with the seat in opening and closing fluid flow between the inlet and the outlet of the valve, the disc guide including a wall having a plurality of spaced apart disc guide apertures formed in an upper portion and a lower portion that increasingly occludes the seat apertures as the disc guide is moved into the closed position; and
 a deflector wall extending upwardly from a base of the seat and into the inner chamber im spaced relation to the seat circumferential wall and seat apertures;
 wherein a tortuous fluid flow pathway is formed as fluid enters through the seat apertures and into the inner seat chamber and exits through the disc guide apertures to minimize fluid cavitation.

13. The assembly of claim 12, wherein the seat apertures each have a lower tip opening, a lower opening portion of a generally consistent width, a middle portion having an increasingly wider width, and a top portion having a generally consistent width.

14. The assembly of claim 12, wherein when the assembly is open 10% or less, the collective flow area through the seat apertures is as small as 25% of the collective flow area through the disc guide apertures; and wherein when the assembly is open 10%-25%, the collective flow area through the seat apertures is approximately half of the collective flow area through the disc guide apertures; and wherein when the assembly is open 25% to 80%, the collective flow area through the seat apertures increases until at 80% open the collective flow area through the seat apertures and the disc guide apertures are approximately equal.

15. The assembly of claim 12, wherein there are a greater number of disc guide apertures than seat apertures.

16. The assembly of claim 15, wherein the are twice as many disc guide apertures as seat apertures.

17. The assembly of claim 12, wherein the disc guide apertures are formed at a non-normal angle through the disc guide wall.

18. The assembly of claim 12, wherein a non-apertured lower portion of the disc guide wall extends into the space between the seat apertures and the deflector wall when moved towards a closed position.

19. The assembly of claim 12, wherein the deflector wall has a scalloped or irregular top edge.

20. The assembly of claim 12, wherein the deflector wall is tapered inwardly away from the seat apertures.

21. The assembly of claim 12, including a boss extending upwardly though the base of the seat and having a through aperture that accepts a stem associated with the disc guide therein, the boss being configured to vary fluid flow therethrough and into the seat inner chamber as the stem is moved along a length of the boss.

22. The assembly of claim 12, wherein a perimeter lip of the disc guide engageable with an upper portion of the seat has a chamfered profile that improves valve regulation stability when disposed adjacent to the seat.

* * * * *